(12) United States Patent
Cewers

(10) Patent No.: US 8,624,467 B2
(45) Date of Patent: Jan. 7, 2014

(54) METHODS, SYSTEMS, AND DEVICES FOR MECHANICAL MOTION AMPLIFICATION

(75) Inventor: Göran Cewers, Limhamn (SE)

(73) Assignee: Mindray Medical Sweden AB, Sundbyberg (SE)

(*) Notice: Subject to any disclaimer, the term of this patent is extended or adjusted under 35 U.S.C. 154(b) by 96 days.

(21) Appl. No.: 13/105,661

(22) Filed: May 11, 2011

(65) Prior Publication Data

US 2011/0285248 A1   Nov. 24, 2011

Related U.S. Application Data

(60) Provisional application No. 61/345,625, filed on May 18, 2010.

(51) Int. Cl.
*H01L 41/08* (2006.01)
(52) U.S. Cl.
USPC .......................................................... 310/328
(58) Field of Classification Search
USPC .......................................................... 310/328
See application file for complete search history.

(56) References Cited

U.S. PATENT DOCUMENTS

| | | | | |
|---|---|---|---|---|
| 4,518,887 A | * | 5/1985 | Yano et al. | 310/328 |
| 4,570,095 A | * | 2/1986 | Uchikawa | 310/328 |
| 4,622,484 A | * | 11/1986 | Okihara et al. | 310/328 |
| 4,644,213 A | * | 2/1987 | Shibuya | 310/328 |
| 4,647,808 A | * | 3/1987 | Shibuya | 310/328 |
| 4,874,980 A | * | 10/1989 | Mine et al. | 310/328 |
| 4,886,382 A | * | 12/1989 | Oota et al. | 400/124.16 |
| 5,328,149 A | | 7/1994 | Reuter | |
| 5,726,520 A | * | 3/1998 | Grahn | 310/328 |
| 6,003,836 A | | 12/1999 | Cewers | |
| 6,175,170 B1 | | 1/2001 | Kota et al. | |
| 6,749,176 B2 | | 6/2004 | Del Garbino et al. | |
| 2006/0175934 A1 | * | 8/2006 | Or et al. | 310/328 |

FOREIGN PATENT DOCUMENTS

| | | |
|---|---|---|
| DE | AT170608 B | 3/1952 |
| EP | 1401029 A2 | 3/2004 |
| JP | 63226083 A | 9/1988 |
| JP | 63262065 A | 10/1988 |
| JP | 02163580 A | 6/1990 |
| WO | 9707348 A1 | 2/1997 |
| WO | 02092496 A2 | 11/2002 |

* cited by examiner

*Primary Examiner* — Mark Bugg
(74) *Attorney, Agent, or Firm* — Kory D. Christensen; Stoel Rives LLP

(57) ABSTRACT

A mechanical amplifier and method for converting a small motion amplitude to a larger motion amplitude are disclosed. The method includes using two or more beams which are connected in series at angles to each other. Undesirable movements arising in the structure are absorbed by the structure through torsion. Each beam is a mechanical motion amplifier, and by connecting these in series, the total amplification is the product of the amplification of the comprised beams. The disclosure also pertains to a device comprising two or more beams connected together at an angle of 90 degrees in one embodiment.

9 Claims, 4 Drawing Sheets

United States Patent US 8,624,467 B2

METHODS, SYSTEMS, AND DEVICES FOR MECHANICAL MOTION AMPLIFICATION

CROSS-REFERENCE TO RELATED APPLICATION(S)

This application claims the benefit of U.S. Provisional Application No. 61/345,625, filed May 18, 2010, which is incorporated herein by reference.

TECHNICAL FIELD

The following disclosure relates to mechanical amplifiers. More particularly, the following disclosure relates to a mechanical amplifier for amplifying the motion of an actuator unit, such as a piezo actuator.

SUMMARY OF THE INVENTION

Methods, systems, and devices for mechanical motion amplification are disclosed.

DETAILED DESCRIPTION

Figure 1:
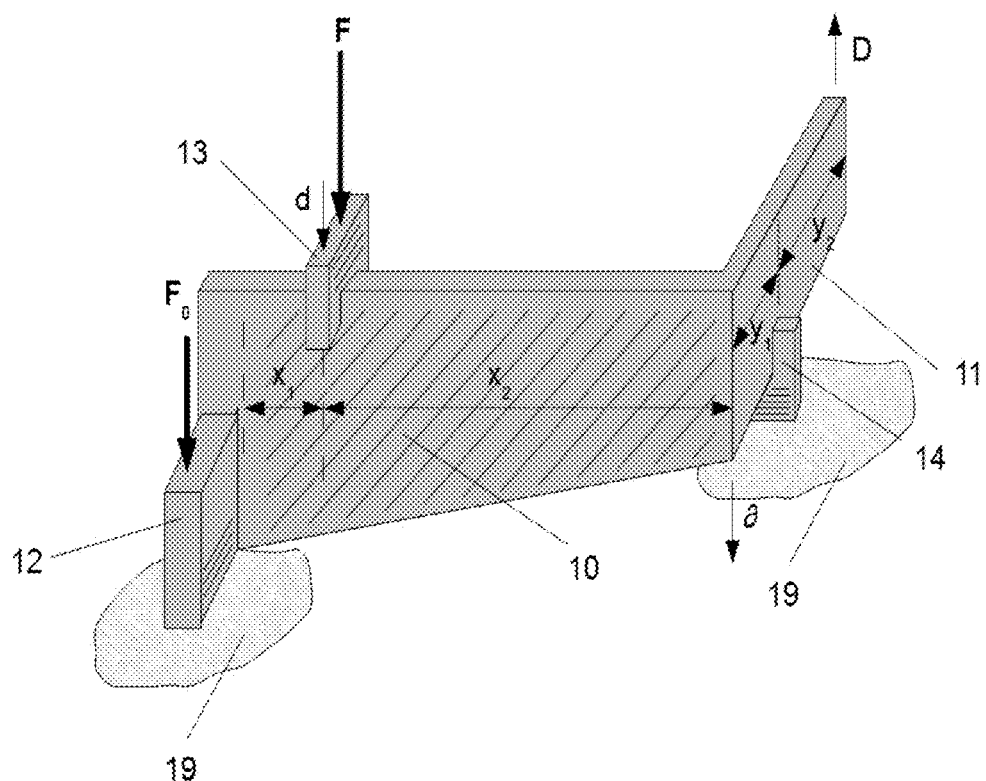
FIG. 1 is a schematic view showing an exemplary embodiment of a mechanical amplifier with angled levers.

Piezoelectric ceramics are being increasingly used in actuator applications, where they are replacing electromagnetic solutions. The reason is that force in proportion to intrinsic mass is approximately ten times larger using piezoelectric ceramic techniques compared to electromagnetic techniques. One example where electromagnets have been replaced by piezo actuators are fuel injection valves in the car industry. This has led to a new generation of car engines with lower fuel consumption and emissions. The piezo actuator technology has made it possible to control the fuel injection almost to the millisecond for each piston stroke.

Unfortunately, replacing electromagnets with piezo actuators is not entirely straightforward, due to the small movement generated by the latter, even though the available force is large. Thus, the generated motion of the piezo actuators must be amplified. This can be achieved in a variety of ways, such as hydraulically (which is common in fuel injection), by mechanical deformation (e.g., U.S. Pat. Nos. 6,749,176 and 6,003,836), or using levers (e.g., U.S. Pat. No. 5,328,149).

Hydraulic mechanical amplifiers are relatively simple to implement. However, this type of design leaves a number of technical issues to be solved, such as the viscosity of the hydraulic fluid, mass, gas content, toxicity, temperature durability, and the tightness of the hydraulic system. These issues increase the cost of the design and make systems unsuitable for various applications, e.g., medical applications.

Mechanical amplifiers employing deformation also have limitations, such as complex valve seats, large dimensions, or limited amplification. Moreover, it is difficult to make cascade connections using this principle.

Levers are simple and may be easily cascade connected. However, technical design issues make it difficult to find a combined solution with articulations having no friction, but with strength, low exhaustion, low weight, high resonance frequency, large amplification, small dimensions, and low manufacturing costs.

In one aspect, the disclosure includes a mechanical motion amplifier for amplification of an amplitude of a motion from an actuator unit. The motion amplifier may include at least two beams connected in a series at an angle, where the thickness of each beam is substantially less than its orthogonal extension, and wherein each beam has at least one supporting element about which the beam is pivotable. When the serial connection is exposed to a pushing or pulling motion having a first amplitude from at least one actuator unit, the amplifier amplifies and generates a second pushing or pulling motion, in parallel in the same plane, with a larger amplitude than the first amplitude. The amplified amplitude and its direction are determined by the gear provided by the design, which depends on how the beams, supporting elements, and at least one actuator unit are positioned in relation to each other.

The beams may be described as having properties, which besides being thin, comprise low torsional strength, low weight, and small dimensions. This leads to various properties being obtained, such as the serial beam design having low inertia and thus a rapid amplification response.

Moreover, in some embodiments, the gearing transmission is obtained by a pushing or pulling motion being applied to a first beam, either from one or a plurality of actuator units, or from a second beam adjacent to the first beam, at a position a distance X1 from the supporting element of the first beam support, which in turn is positioned a distance X2 from where the first beam is touching a third beam or the last beam in the series where the final amplified motion is to be applied. Optionally, the device may be designed such that the distances are X1<=X2 for each serially connected beam.

In order to achieve an amplified amplitude of the final motion, the above-mentioned relation should be complied with for each beam connected in the series.

In some embodiments of the mechanical motion amplifier, the position of each beam's supporting element is adapted to providing a transmitted amplified motion amplitude by the beam that is pushing or pulling.

By adjusting where the supporting element for each individual in-series connected beam is positioned, the final amplified motion becomes pushing or pulling. For example, a pushing motion from an actuator unit may be an amplified pushing motion, but if one alters the position of the supporting elements, the same pushing motion may be converted to an amplified pulling motion.

In some embodiments, the beams of the mechanical motion amplifier may be made of a foil. By making beams of foil, they may be manufactured having various properties, such as being thin, having low torsional strength, low weight, and small dimensions.

In yet another embodiment, the beams connected in series of the mechanical motion amplifier may be made as an integral part of a continuous piece of foil.

In still another embodiment, twisting motions and lateral motions that may occur against a first beam, caused by motions of a second adjacent beam, may be absorbed by the first beam by means of lateral bending and torsion.

Twisting motions in the structure of beams connected in series are mainly absorbed, due to the angle between the beams, by the first beam by means of torsion.

In another aspect of the mechanical motion amplifier, a beam having no amplifying effect of the motion may connect two adjacent beams having an amplifying effect of the motion.

In some embodiments, the actuator unit may be at least one piezo actuator.

Moreover, the in-series connected beams may form part of a system of a plurality of mechanical motion amplifiers, in which the design allows at least two units of in-series connected beams to be linked together in order to, in a compact way, distribute the pushing and/or pulling motions from one or more actuator units, positioned vertically against the at least two units of in-series connected beams, and generate, in at least two zones, parallel pushing and/or pulling motions with amplified amplitude.

This type of system, having more than two units of beams connected in series, provides for effectively obtaining an amplified motion amplitude (which may be either pushing or pulling) to occur in parallel, but at the same time, almost simultaneously. From the same system, a combination of pushing and pulling motions may be obtained.

Another aspect of the disclosure includes a mechanical motion amplification method. The method may include using at least two in-series connected beams, wherein each beam is designed to have low torsional strength, low weight, and small dimensions. According to the method, the pushing or pulling motion from at least one actuator unit having a first amplitude, on one of the beams connected in series, is provided with an amplified amplitude as a result of cooperation between the beams connected in series so that the total amplification of the first pushing or pulling motion's amplitude is a product of the cooperating beams' amplifying effect on the motion amplitude. Thus, the final amplified pushing or pulling motion is parallel to the first pushing or pulling motion.

The rigidity of a beam having square cross section is increased by the cube of the beam's cross sectional width in the working direction of leverage. Thus, the cross sectional width of the beam has been made greater compared to the orthogonal width in the working direction. This also decreases the mass and provides a high resonance frequency.

Metal with a low surface roughness has greater resistance to exhaustion than a processed surface. Therefore, in some embodiments, a low surface roughness is used. In one embodiment, a cross section of the foil is not bent, but only the actual foil orthogonally to it.

A thin beam has low torsional strength. This may be exploited to absorb motions in the device. The thickness of the foil may be in the range of 0.1-1 mm. In some embodiments, the thickness is approximately 0.5 mm.

Motions of two beams in a row, which in an undesirable manner are working against each other in a plane, may, by bending one of the beams in an angle relative to the other, be absorbed, so that the motions may be converted to a twisting of the first beam.

By making the beams thin, they may be manufactured from foil, and with a design according to the disclosure, it is easy to produce three dimensional structures by bending the foil to the desired structure.

To work with large forces, structures may be provided that comprise several parallel beam systems.

Another aspect of the disclosure provides a method for manufacturing a mechanical motion amplifier. The manufacturing method involves cutting two beams connected in series from a single piece of foil and bending the foil to make two beams connected in series at an angle wherein each beam has a thickness considerably smaller than their orthogonal extension, bending the foil thickness orthogonally to obtain two angled beams and, optionally, arranging a piezo actuator parallel to one of the two beam's thickness at one of the two beams to create a motion that may be amplified by the two angled connected beams.

As shown in FIG. 1, an example of a device, in accordance with an embodiment of the disclosure, is provided by a first beam 10, which at an angle 12, is lying against a base 19 orthogonally in line with the lever.

Force F0 holds the beam pressed against the base 19. By means of a foil 13 (orthogonal in relation to the beam), the beam is exposed to a downward motion d. The extension X1+X2 of beam 10 thus forms a lever with amplification X1+X2/X1.

The motion $\partial$ of the first beam 10 is then directly transferred as incoming motion to a second beam 11. Under load, this beam 11 will be pivoted longitudinally about supporting element 14. Due to the angle between the two levers, this pivoting motion is absorbed by the first beam 10 by means of torsion. The area of transverse lines on the first beam 10 indicates this. The amplification of the second beam is $-Y2/Y1$, and the amplification D/d of the entire device is the product of the levers' amplification.

Figure 2:
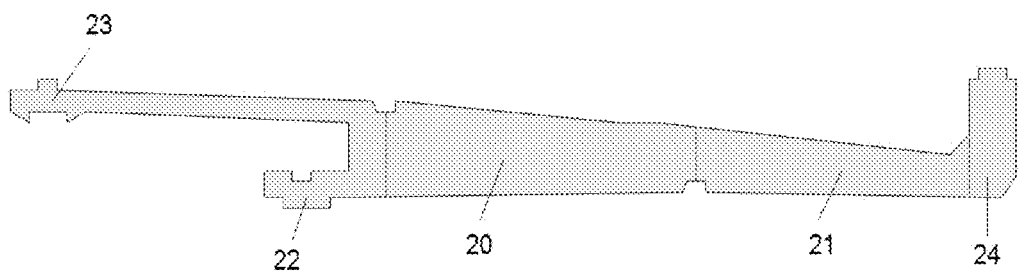
FIG. 2 is a schematic view showing an exemplary embodiment of a foil profile, which may be bent into a three dimensional structure.

All parts included in FIG. 1 may be made in a continuous piece of foil, as shown in FIG. 2. FIG. 2 illustrates first and second beams 20, 21, a supporting element 22, a foil 13 (which correspond to similar parts 10, 11, 14, and 13, respectively, in FIG. 1) and links 24 (which are similar to links 34 described in connection with FIG. 3).

Figure 3:
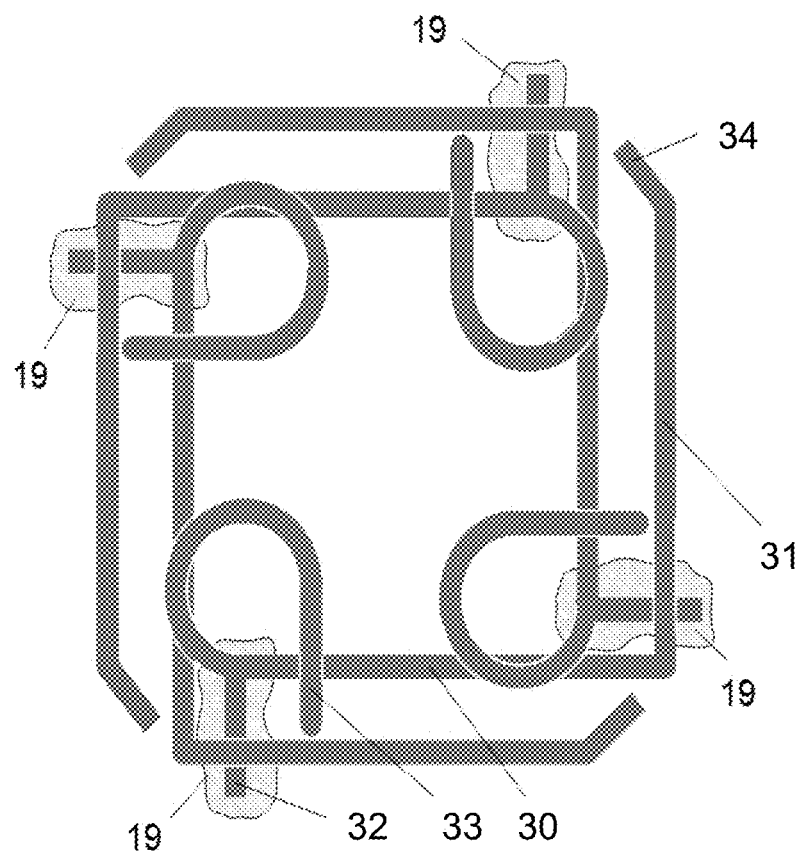
FIG. 3 is a schematic view showing an exemplary embodiment of how four foil profiles, as shown in FIG. 2, may be bent and linked to form a complex structure.

By bending the above-mentioned pieces of foil at suitable positions, as illustrated, a structure, according to FIG. 3, may be produced using four identical pieces of foil. The forces are then distributed into four groups, while the motions are parallel. Force F0 is, in this case, passed on from beam 31. The links 34 transmitting the initial motion are provided at an angle in order to absorb shear motions.

This structure provides for manufacturing of a motion amplification element providing approximately 50 times amplification, a volume of less than 0.5 cm$^3$, a weight of less than one gram and handling of actuator forces in the range of 200 N. Higher amplification may be obtained by adding a third beam to each of the four beam devices involved. The low weight and the small dimensions result in low inertia of the system, and thus a rapid response to an amplified actuator motion.

Since a beam acting as a lever has a motion amplification, the first beam must manage forces with an amplification factor greater than for the following beam. This may be managed by making the beam higher in the direction of the load. An example for the first beam 10 is shown in FIG. 1, which increases in height towards the actuator point at foil 13. However, this is only possible to a limited extent, as the beam geometry may be jeopardized. Instead, the beam thickness may be increased orthogonally towards the direction of the load, as a completion. However, a design of this kind could result in variations of the foil thickness in a design having more than one beam in the same piece of foil. Moreover, a thicker foil may result in difficulties in bending it to the desired structures.

Figure 4:
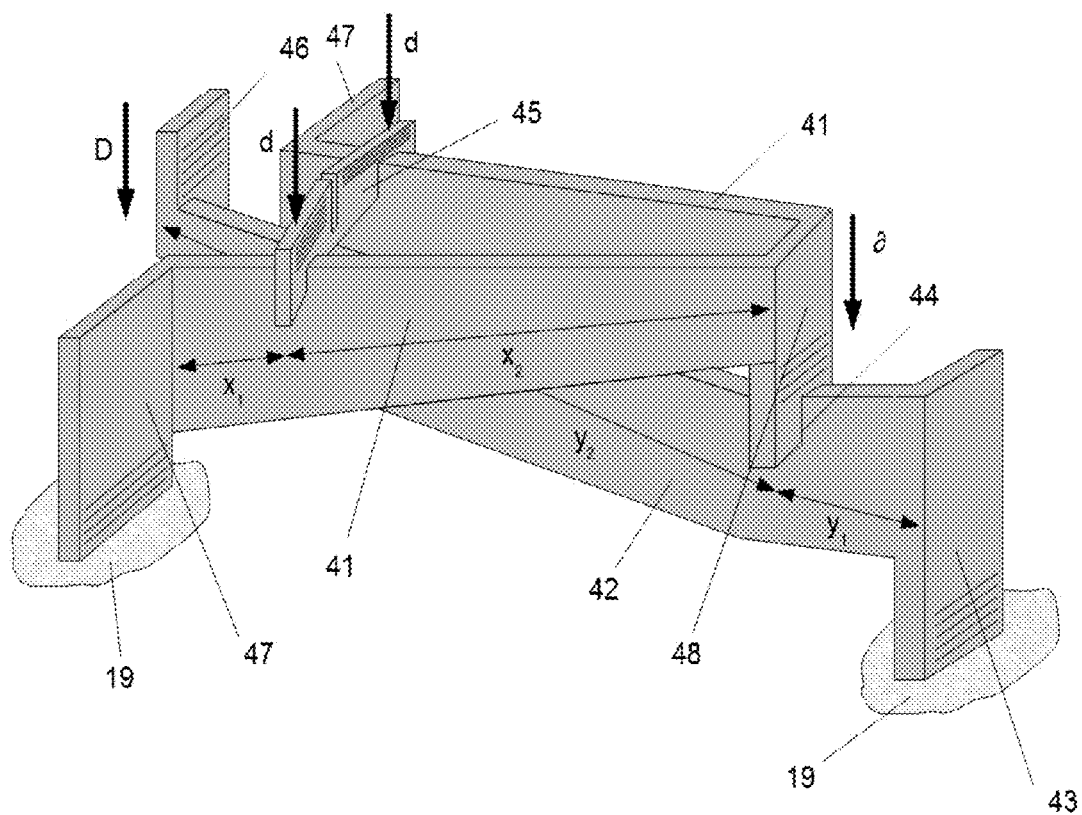
FIG. 4 is a schematic view showing yet another exemplary embodiment of a mechanical amplifier with angled levers.

For this reason, in some embodiments, the first beam may be doubled in the device. FIG. 4 is showing an example of such a design. FIG. 4 shows one of six segments from FIG. 5. The first beam 41 has two beams merging into one crossbeam

48. This crossbeam 48 extends via a flexible part (the flexible areas are marked as transverse lines in the figure) down to the next beam 42. This connection 44 may be rigid to avoid wear in the connection.

In one embodiment, this connection may be made with a snap-connection included in the foil structure.

The input motion to the first beam 41 occurs via segment 45 from the actuator. The segment 45 may have flexible areas to absorb motions generated by the beam pivoting about base 19. The folded-out angle from the first beams 41 serves as a flexible support element against base 19. The angles 47 do not necessarily need to be fixed to the base 19. Instead it may be able to ride on the edge of the angle against the base. The angle does not need to flex in this case. The second beam 42, which is single, is pushed down by the first beam 41. The angle 43 folded out from the second beam 42 serves as flexible point of support against the base 19. The folded out angle 46 transmits the structure's initial motion via a flexible link marked as an area with lines. The structure's amplification D/d is then $[(X1+X2)/X1]*[(Y1+Y2)/Y1]$.

Figure 5:
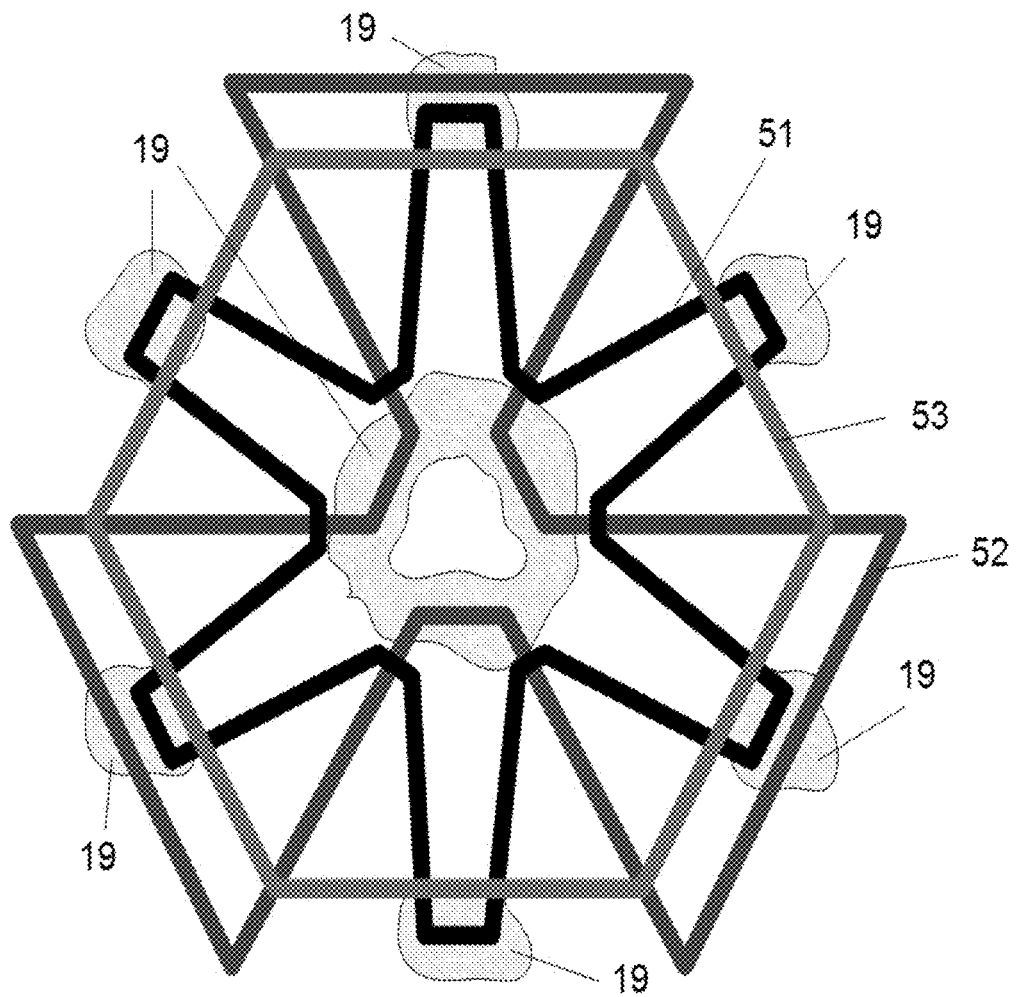
FIG. 5 is a schematic view showing an exemplary embodiment of how a plurality, in this case six, of connected foil structures, as shown in FIG. 4, may be linked to a complex structure.

The device shown in FIG. 4 may be regarded as a segment of the structure shown in FIG. 5.

The parts 47, 41 and 48 shown in FIG. 4 are six folded to a continuous foil which is folded and closed at the ends and obtains a structural shape 51, as shown in FIG. 5. Parts 43, 42 and 46 are six-folded in the same way to obtain a structural shape 52, as shown in FIG. 5. Actuator linkage 47 is also six-folded and obtains the structural shape 53, as shown in FIG. 5. This method results in a mechanical amplifier as shown in FIG. 4 and FIG. 5 with a force distribution from the actuator to twelve adjacent points and an exchanged motion from six linkages.

The principles described above may be used in combination with actuators with small motion, and besides piezo actuators, and combinations may be made with other types of actuators (e.g., electrostrictive, thermal, or chemical).

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. The scope of the invention is, therefore, defined by the following claims. The words "including" and "having," as used herein, including the claims, shall have the same meaning as the word "comprising."

What is claimed is:

1. A mechanical motion amplifier for amplification of an amplitude of a motion from an actuator unit, comprising:
    at least two beams connected in a series at an angle, each beam having a thickness substantially smaller than its orthogonal expansion;
    wherein each beam in turn comprises at least one supporting element about which said beam is pivotable;
    wherein, when said serial connection is exposed to a pushing or pulling motion having a first amplitude from at least one actuator unit, the actuator unit transferring motion to a first beam of the at least two beams through a segment disposed at an angle to a direction along the length of the first beam, the motion is amplified and a second, substantially parallel motion is generated having a second amplitude larger than said first amplitude; and
    wherein said amplified second amplitude and its direction is obtained from a transmission of a construction dependent on how said beams, said supporting elements, and said at least one actuator unit are positioned in relation to each other.

2. The mechanical motion amplifier according to claim 1, wherein said transmission is provided by means of a pushing or pulling motion applied on said first beam, either from one or a plurality of actuator units or from a second beam bearing on said first beam at a position at a distance X1 from said supporting element of said first beam, which, in turn, is positioned at a distance X2 from where said first beam is touching a third beam or the last beam in the series where the final amplified motion is to be applied.

3. The mechanical motion amplifier according to claim 1, wherein said beams are made of a foil.

4. The mechanical motion amplifier according to claim 3, wherein said beams connected in series is a continuous piece of foil.

5. The mechanical motion amplifier according to claim 1, wherein twisting motions and lateral motions against a first beam, caused by motions of a second beam bearing on the first beam, are absorbed by said first beam by way of lateral bending and torsion.

6. The mechanical motion amplifier according to claim 1, wherein a beam having no amplifying effect of the motion connects two adjacent beams having amplifying effect of the motion.

7. The mechanical motion amplifier according to claim 1, wherein said actuator unit is at least one piezo actuator.

8. A system of mechanical motion amplifiers comprising:
    one or more actuator units; and
    at least two units of in-series connected beams linked together in order to distribute pushing and/or pulling motions from the one or more actuator units positioned vertically against the at least two units of serially connected beams, wherein the system is to generate in at least two zones parallel pushing and/or pulling motions with amplified amplitude and wherein at least one actuator unit transfers motion at least one beam through a segment disposed at an angle to a direction along the length of the beam.

9. The system of mechanical motion amplifiers according to claim 8, wherein at least one beam is higher in a direction of the load and/or a thickness of the at least one beam increases orthogonally towards a direction of a load.

\* \* \* \* \*